(12) United States Patent
Hardman et al.

(10) Patent No.: US 12,308,596 B2
(45) Date of Patent: May 20, 2025

(54) OPTICAL SYSTEM

(71) Applicant: Nomad Atomics Pty Ltd, Acton (AU)

(72) Inventors: Kyle Sage Hardman, Lyneham (AU); Christian Michael Freier, Acton (AU)

(73) Assignee: NOMAD ATOMICS PTY LTD, Acton (AU)

( * ) Notice: Subject to any disclaimer, the term of this patent is extended or adjusted under 35 U.S.C. 154(b) by 609 days.

(21) Appl. No.: 17/621,581

(22) PCT Filed: Jun. 29, 2020

(86) PCT No.: PCT/AU2020/050677
§ 371 (c)(1),
(2) Date: Dec. 21, 2021

(87) PCT Pub. No.: WO2021/000008
PCT Pub. Date: Jan. 7, 2021

(65) Prior Publication Data
US 2022/0352684 A1 Nov. 3, 2022

(30) Foreign Application Priority Data
Jul. 1, 2019 (AU) .................. 2019902324

(51) Int. Cl.
*H01S 3/00* (2006.01)
*G02F 1/35* (2006.01)
(Continued)

(52) U.S. Cl.
CPC .......... *H01S 3/0085* (2013.01); *G02F 1/3515* (2013.01); *G21K 1/006* (2013.01); *H01S 3/10015* (2013.01); *H01S 3/1003* (2013.01)

(58) Field of Classification Search
CPC .. H01S 3/0085; H01S 3/10053; H01S 3/1003; H01S 3/10015; G21K 1/006; G04F 5/14
See application file for complete search history.

(56) References Cited

U.S. PATENT DOCUMENTS 9,823,540 B2   11/2017  Gottwald et al.
2020/0395726 A1* 12/2020  Lien .................. H01S 3/0092

FOREIGN PATENT DOCUMENTS

WO    201902110 A1    1/2019
WO    2019102157 A1   5/2019

OTHER PUBLICATIONS

PCT/AU2020/050677. International Search Report—Written Opinion (Jul. 13, 2020).
(Continued)

*Primary Examiner* — Michael Carter
(74) *Attorney, Agent, or Firm* — LOZA & LOZA, LLP; David S. Sarisky (57) ABSTRACT

The present disclosure provides an optical system for controlling atoms. The optical system comprises a laser source for generating a laser beam at a carrier frequency and microwave and radio frequency (MW/RF) sources for generating I and Q modulation signals at a set of frequencies, wherein the set of frequencies comprises at least two frequencies. The optical system further comprises an IQ modulator configured for receiving the laser beam and the generated signals at the set of frequencies and for outputting an output laser beam (Eout) based on the received laser beam and the generated signals at the set of frequencies, wherein the output laser beam (Eout) comprises multi-toned optical single-sidebands (MT-OSSB) at the set of frequencies with the carrier frequency being suppressed.

12 Claims, 7 Drawing Sheets

(51) Int. Cl.
  *G21K 1/00* (2006.01)
  *H01S 3/10* (2006.01)

(56) References Cited

OTHER PUBLICATIONS

Zhu, Lingxiao. "A cold atoms gravimeter for use in absolute gravity comparisons." Ultracold Atoms Group School of Physics and Astronomy College of Engineering and Physical Sciences The University of Birmingham. 2018 (151 pages).

Zhu, Lingxiao et al. "Application of optical single-sideband laser in Raman atom interferometry." vol. 26, No. 6 | Mar. 19, 2018 | Optics Express 6542. (12 pages).

Hu, Qing-Qing et al. "Observation of vector and tensor light shifts in 87Rb using near-resonant, stimulated Raman spectroscopy." Physical Review A 97, 013424 (2018). (7 pages).

Varoquaux, G. et al. "I.C.E .: An Ultra-Cold Atom Source for Long-Baseline Interferometric Inertial Sensors in Reduced Gravity." May 22, 2007. << http://www.ice-space.fr>> (9 pages).

Higuma, Kaoru et al. May 22, 2007. "A bias condition monitor technique for the nested Mach-Zehnder modulator." IEICE Electronics Express, vol. 3, No. 11, 238-242. Published Jun. 10, 2006. (5 pages).

Luo, Qin et al. "A compact laser system for a portable atom interferometry gravimeter." Rev. Sci. Instrum. 90, 043104 (2019); << https://doi.org/10.1063/1.5053132>> (6 pages).

Aupetit-Berthelemot, C. et al., "OSSB-OFDM transmission performance using a dual electro absorption modulated laser in NG-PON context," 2014 22nd European Signal Processing Conference (EUSIPCO), 2014, pp. 1900-1904.

International Preliminary Report on Patentability, International Patent Application No. PCT/AU2020/050677, Jan. 13, 2022, 6 pgs.

European Search Report, European Patent Application No. 20834667.6, Jun. 29, 2023, 7 pgs.

\* cited by examiner

OPTICAL SYSTEM

TECHNICAL FIELD

The present invention relates generally to an optical system and, in particular, to an IQ modulation optical system configured to provide laser beams to control atoms.

BACKGROUND

Complex laser systems, which are capable of generating laser beams with different optical modes as well as dynamic frequency and amplitude control, are important for devices using cold-atom interferometry or optical interrogation techniques (such as coherent population trapping (CPT)). Examples of devices based on cold-atom interferometry are accelerometers, gravimeters, gradiometers, gyroscopes, while an example of a device based on optical interrogation techniques is an atomic clock.

These devices often require two or more optical frequencies at the same time to control the atom used in cold-atom interferometry or optical interrogation techniques. For example, alkali atoms such as Rubidium are cooled using laser beams at the optical cooling transitions and one or more repump transitions. The frequency difference between cooling and repump transitions is typically on the order of a few GHz (e.g., 6.8 GHz for Rubidium 87).

In another example, sensors based on atom interferometry usually employ two-photon transitions to transfer atoms between different internal and/or momentum states. This requires two simultaneous laser beams at two respective optical frequencies with a fixed phase relationship (or phase-lock) between the two laser beams.

In yet another example, two different types of two-photon transitions are commonly employed for sensors based on atom interferometry. Atoms undergoing Raman transitions change their momentum state as well as their internal state and require two phase-locked laser beams with a frequency difference on the order of GHz (e.g., 6.8 GHz for Rubidium 87). Bragg transitions, on the other hand, only change the momentum state of the atoms and require a frequency difference on the order of 10 kHz-1 MHz.

The above requirements are often met by combining multiple phase-locked laser sources in the laser system. This conventional approach is limited in the speed and extent at which the frequencies of the laser sources can change, due to bandwidth and dynamic range limitations of the laser sources and/or the phase-locking circuitry. Operating and controlling multiple laser sources also increases the complexity as well as the size, weight and power of the laser system.

Figure 1A:
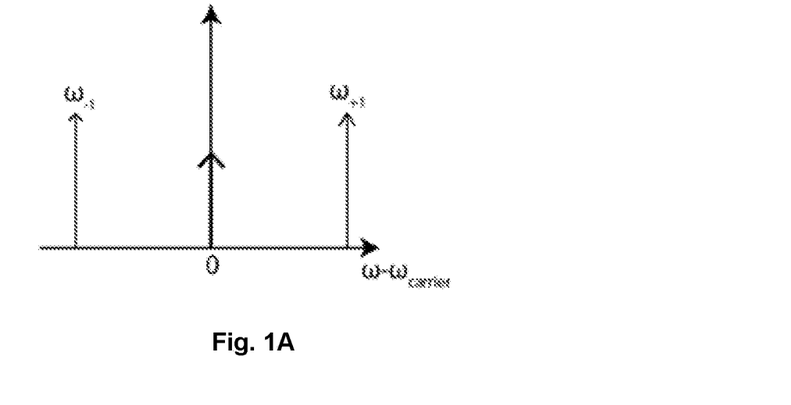
FIG. 1A shows an example spectrum of a phase modulation.
Figure 1B:
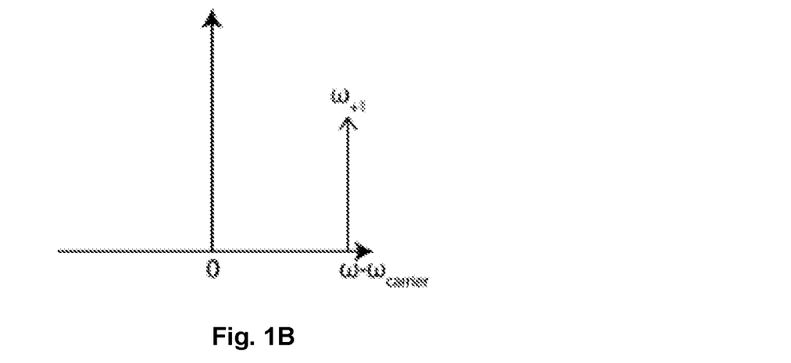
FIG. 1B shows an example spectrum of an optical modulation technique to generate Carrier-Suppressed single-sideband signal.

Another conventional technique used in meeting the above requirements is to generate the required frequencies through optical phase modulation, e.g. using an electrooptical modulators (EOM). Phase modulation, however, generates additional and usually unwanted sidebands which reduce the overall power efficiency of the laser system and often cause systematic shifts of the sensor output. FIG. 1A shows an example of the spectrum of such a phase modulation, where there is an additional negative sideband. The additional negative sideband is symmetric with the positive sideband around the carrier frequency, but the negative sideband is out of phase by 180°. FIG. 1B shows another example of the spectrum of an optical modulation technique where the negative sideband and carrier frequency are suppressed.

SUMMARY

It is an object of the present invention to substantially overcome, or at least ameliorate, one or more disadvantages of existing arrangements.

Aspects of the present disclosure provide an optical system comprising an IQ modulator configured to provide a laser beam modulated at two or more frequencies. The frequencies of the generated laser beam are at the IQ modulation frequencies generated by RF/MW sources, relative to the optical frequency of the carrier (provided by the laser source). Therefore, tuning the bandwidth (typically ~40 GHz) of the IQ modulator results in the generation of one or more laser beams at the modulation frequencies of the IQ modulator.

Therefore, the laser beam resulting from the aspects of the present disclosure can be tuned in an agile manner over a broad spectrum based on the bandwidth of the I/Q modulator without changing the source laser frequency. The speed at which the laser beam frequency and amplitude can be changed is based on the agility of the RF/MW source.

Figure 2:
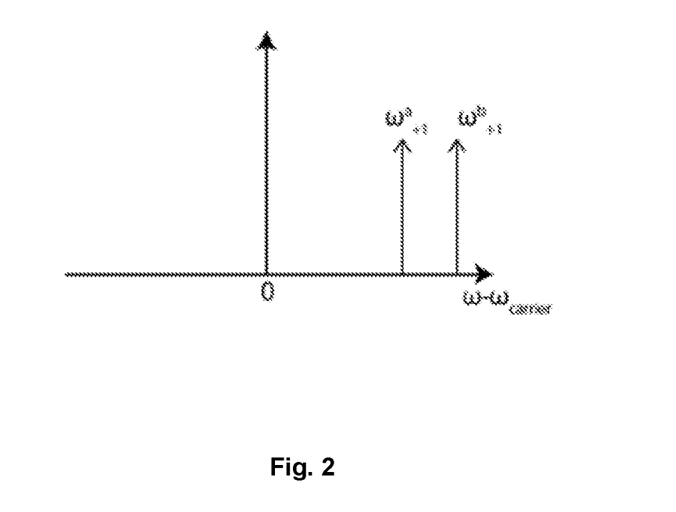
FIG. 2 shows an example spectrum of Multi-Tone Carrier-Suppressed single-sideband (MT-OSSB) laser beams.

For purposes of this disclosure radio-frequency (RF) signals are hereby defined by having a frequency lower than 1 GHz whereas microwave (MW) signals have a frequency larger than 1 GHz up to the bandwidth of the IQ modulator. For example, in one arrangement this bandwidth is 40 GHz. The IQ modulator is operated to generate carrier-suppressed multi-tone single sidebands (MT-OSSB) by adjusting bias control voltages of the IQ modulator. An example of the spectrum of the MT-OSSB generated by aspects of the present disclosure is shown in FIG. 2, where the negative sideband and carrier frequency are suppressed while generating multiple principal sidebands.

According to a first aspect of the present disclosure, there is provided an optical system for controlling atoms, the optical system comprising: a laser source generating a laser beam at a carrier frequency; microwave and radio frequency (MW/RF) sources generating I and Q modulation signals at a set of frequencies, wherein the set of frequencies comprises at least two frequencies; and an IQ modulator configured for receiving the laser beam and the generated signals at the set of frequencies and for outputting an output laser beam based on the received laser beam and the generated signals at the set of frequencies, wherein the output laser beam comprises multi-toned optical single-sidebands (MT-OSSB) at the set of frequencies with the carrier frequency being suppressed.

Other aspects are also disclosed.

BRIEF DESCRIPTION OF THE DRAWINGS

Some aspects of the prior art and at least one embodiment of the present invention will now be described with reference to the drawings and appendices, in which.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Figure 3:
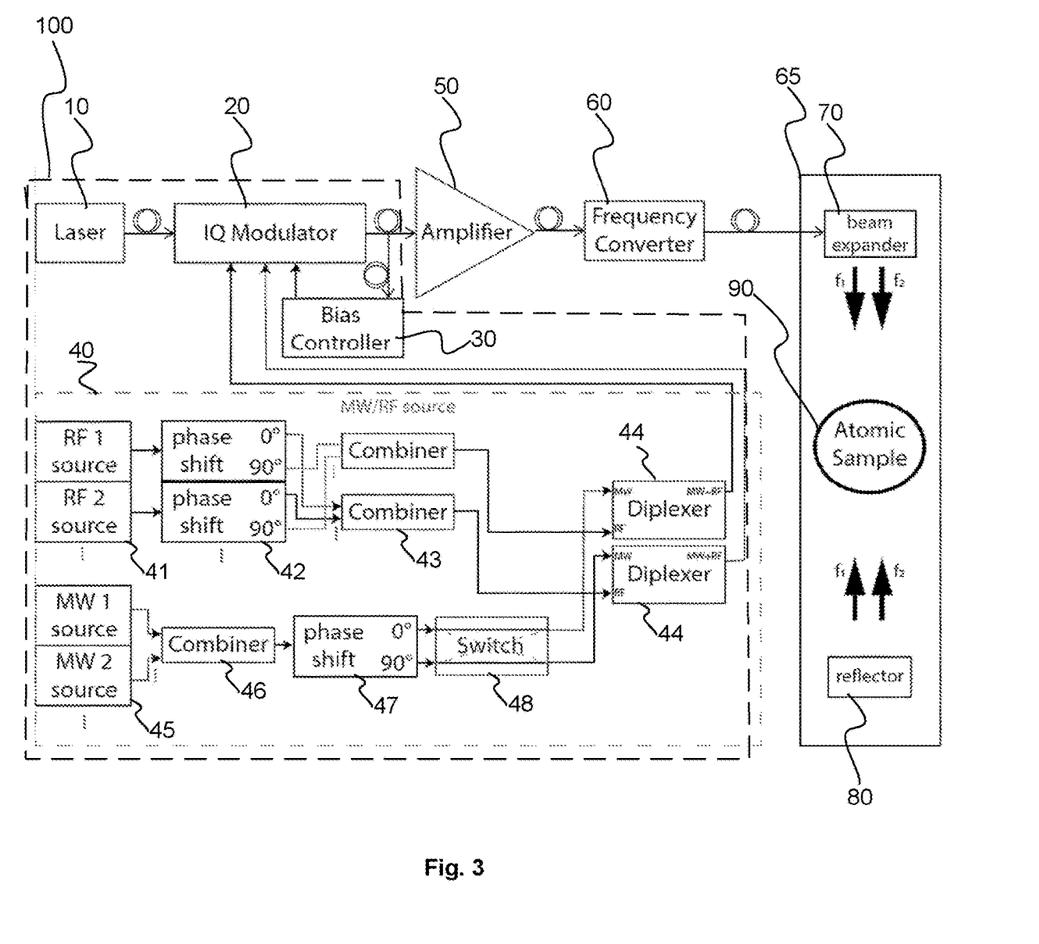
FIG. 3 is a block diagram of a system for generating laser beams with MT-OSSB.

FIG. 3 shows a system that comprises an optical system 100, an amplifier 50, a frequency converter 60, and a device 65. The optical system 100 is configured to generate a laser beam at multiple frequencies that can be used to control atoms of the device 65. As discussed above, examples of such control include cooling the atoms, transitioning the atoms between states, and the like.

The optical system 100 includes a laser 10, an IQ modulator 20, a bias controller 30, and a modulation signal module 40. The optical system 100 then outputs laser beams, which are amplified by the amplifier 50, and converted in frequency by the frequency converter 60. The amplifier 50 and the frequency converter 60 are optional components that may be omitted if the optical system 100 outputs a laser beam at the correct wavelength and sufficient power for the purposes of the particular device 65. The frequency converter 60 may comprise a nonlinear optical frequency converter to shift the optical frequencies of the laser beam output of the IQ modulator 20 into a range suitable to control the relevant atoms.

In the example provided in FIG. 3, the device 65 is a schematic representation of an atom interferometer, which comprises an optical subsystem for interaction with an atomic sample 90. The atomic sample 90 includes the atoms to be controlled by the laser beams. Further, the atomic sample 90 may be an atomic vapour. The device 65 may comprise a magneto-optical trap (MOT) (not shown explicitly) in which atoms are cooled through interactions with the modulated laser beam (i.e., the output laser beam of the optical system 100).

In one arrangement, the device 65 comprises an optical subsystem having a beam expander 70 and a reflector 80. The beam expander 70 directs a modulated laser beam at the atomic sample 90, while the reflector 80 reflects the laser beam from the beam expander 70 back towards the atomic sample 90. The beam expander 70 and reflector 80 can be used to implement optical cooling of the atomic sample 90. For example, when a laser beam at frequencies of 50 MHz and 6.8 GHz enter the device 65, the beam expander 70 and reflector 80 create a retro-reflected laser beam which then passes through the atomic sample 90 for cooling and/or repumping the atoms of the atomic sample 90. Two additional pairs of expanders and reflectors along perpendicular directions can then be used to create 3D cooling of 87Rb atoms in optical molasses. When combined with a suitable magnetic field gradient this can be used to implement a 3D magneto-optical trap (MOT).

The beam expander 70 and reflector 80 can also direct the modulated laser beam from the optical system 100 to the atoms 90 to induce two-photon Bragg and Raman transitions. For this purpose, the optical system generates two optical frequencies (off-resonant from atomic transitions) with a relative frequency difference of 10 kHz-5 MHz (Bragg transitions) to 6.8 GHz (87Rb Raman transitions).

The above description of the device 65 is an example of a suitable device for which the laser beam generated by the optical system 100 can be used. The device 65 may also be an optical interrogation device configured to perform an optical interrogation technique, which can be used for atomic clocks or atomic magnetometers.

The laser 10 is a laser source for generating a laser beam at a carrier frequency. Examples of the laser 10 includes a diode laser or fibre laser (at a wavelength in the working range of the IQ modulator 20; for example, a laser at a wavelength of 1560 nm). In one arrangement, the carrier frequency is locked to a frequency reference such as an atomic transition or stable optical cavity. The laser beam generated by the laser 10 is then output to the IQ modulator 20, which modulates the laser beam at different frequencies depending on the modulation signals received by the IQ modulator 20 from the modulation signal module 40.

The operation of the IQ modulator 20 is controlled by the bias controller 30 and the modulation signal module 40, which provides the I and Q phase modulation signals to the IQ modulator 20 so that the IQ modulator 20 modulates the laser beam (of the laser 10) at the frequencies (i.e., a target output) determined by the I and Q modulation signals. The output of the IQ modulator 20 is provided to the amplifier 50, the frequency converter 60, and, in turn, to the device 65. Alternatively, if the amplifier 50 and the frequency converter 60 are omitted, then the output of the IQ modulator 20 is provided directly to the device 65.

The bias controller 30 provides bias control voltages to the phase shifters (e.g., 22c, 24c, 26—see the discussion relating to FIG. 4) so that the phase shifters provide the required phase biases. In one arrangement, the bias controller 30 provides the bias control voltages at the relevant periods of time by holding the bias control voltages constant at previously determined values. In an alternative arrangement, the bias controller 30 employs advanced control methods to stabilize the bias phases in the presence of bias drifts of the IQ modulator 20. These methods include monitoring the IQ modulator output with a detector (such as a photodetector or a scanning Fabry-Perot cavity) and adjusting the bias control voltages so that the IQ modulator output is at the target output.

By simultaneously inserting I and Q modulation signals at different frequencies into the IQ modulator 20, multi-tone carrier-suppressed single sidebands (MT-OSSB) are generated. The advantage of the IQ modulation scheme, as opposed to an EOM, is the suppression of additional sidebands (by typically ~20 dB), which prevents systematic shifts in an atom interferometer (when the optical system 100 is used by such an atom interferometer) and improves the power efficiency of the optical system 100.

Figure 4:
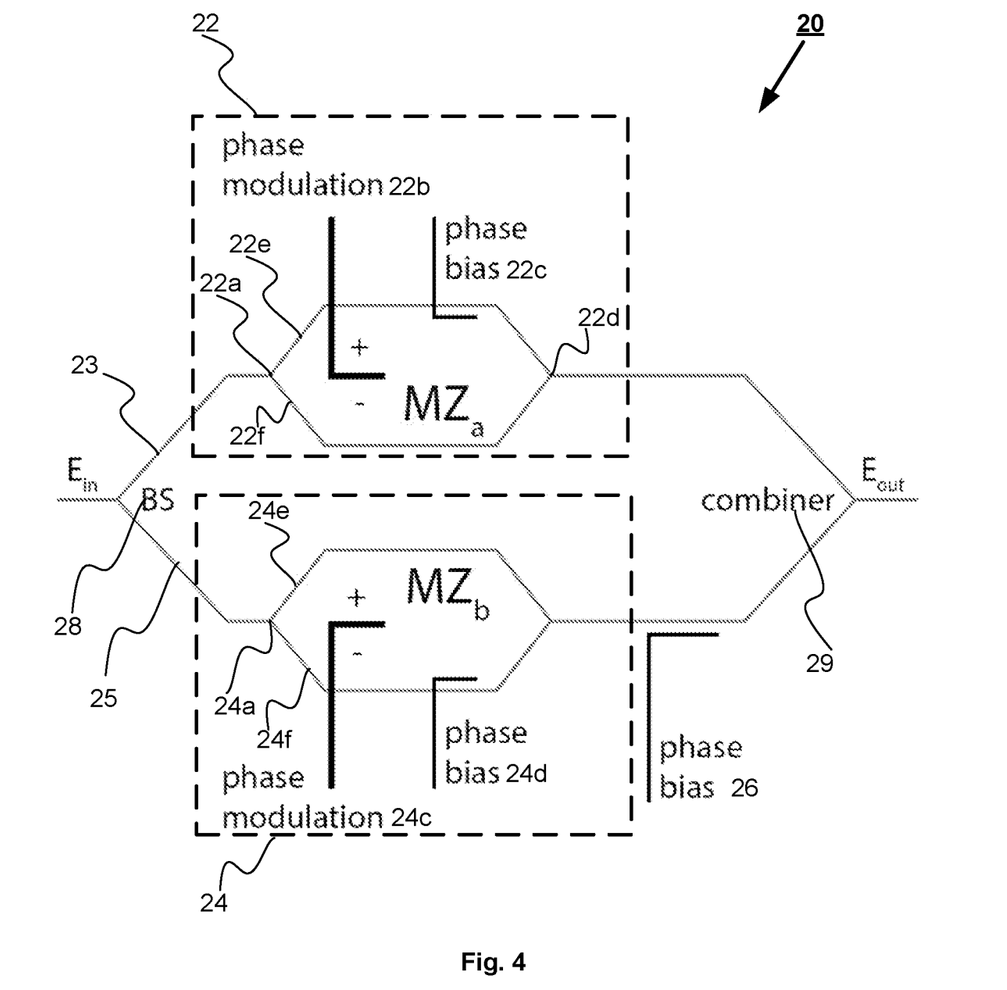
FIG. 4 is a block diagram of an IQ modulator of the system of FIG. 3.

FIG. 4 shows a block diagram of the IQ modulator 20 for generating the MT-OSSB. The IQ modulator 20 includes a beamsplitter 28, Mach-Zehnder interferometers 22 and 24, a phase shifter 26, and a combiner 29. The laser beam from the laser 10 is indicated in FIG. 4 as Ein and is received by the beamsplitter 28. The beamsplitter 28 splits the laser beam Ein equally into two arms 23 and 25. For clarity sake, the two arms 23 and 25 (into which the laser beam Ein from the beamsplitter 28 is split) will be referred to herein as the first arms 23 and 25.

In the first arm 23, one half of the laser beam Ein is fed into the first Mach-Zehnder interferometer 22 (MZa) and, in the other first arm 25, the other half of the laser beam Ein is fed into the second Mach-Zehnder interferometer 24 (MZb). MZa 22 also receives the I modulation signal (from the modulation signal module 40) to phase modulate the received half of the laser beam Ein. MZb 24 also receives the Q modulation signal (from the modulation signal module 40) to phase modulate the received other half of the laser beam Ein. Further, MZa 22 and MZb 24 receives respective bias control voltages from the bias controller 30 to maintain the required phase differences in MZa 22 and MZb 24 respectively.

MZa 22 comprises a beamsplitter 22a, a pair of phase modulators 22b, a bias phase shifter 22c, and a combiner 22d. The beamsplitter 22a splits the incoming laser beam Ein (from the first arm 23) into two second arms 22e and 22f. That is, laser beam Ein in the first arm 23 is further split by the beamsplitter 22a into the second arms 22e and 22f in the MZa 22.

Similarly, MZb 24 comprises a beamsplitter 24a, a pair of phase modulators 24b, a bias phase shifter 24c, and a combiner 24d. The beamsplitter 24a splits the incoming laser beam Ein into two third arms 24e and 24f. That is, the laser beam Ein in the first arm 25 is further split by the beamsplitter 24a into the third arms 24e and 24f in the MZb 24.

The pair of phase modulators 22b in MZa 22 are disposed on the respective second arms 22e and 22f to phase modulate the laser beams in the respective second arms 22e and 22f of MZa 22 using the received I modulation signal. The pair of phase modulators 22b modulates the laser beams in the respective second arms 22e and 22f in a push-pull operation. That is, the laser beam phase in one of the second arms 22e is modulated with the I modulation signal in one direction (e.g., positive direction), while the laser beam phase in the other second arm 22f is modulated with the I modulation signal in the opposite direction (e.g., negative direction).

Similarly, the pair of phase modulators 24b in MZb 24 are disposed on the third arms 24e and 24f to phase modulate the laser beams in the respective third arms 24e and 24f of MZb 24 using the received Q modulation signal in a push-pull operation.

The pair of phase modulators 22b and 24b in each of MZa 22 and MZb 24 receives the I and Q modulation signals from the modulation signal module 40, as discussed above.

A bias phase shifter 22c in one arm (e.g., 22e) of MZa 22 exerts a relative phase shift of the I-modulated laser beam in one of the second arms 22f in MZa 22 (with respect to the other second arm 221) by 180°. The amount of phase shift exerted by the bias phase shifter 22c is controlled by a bias control voltage from the bias controller 130. The I-modulated laser beams in both second arms 22e and 22f are then combined by the combiner 22d. If the bias phase shifter 22c exerts a phase shift of 180° to one second arm (e.g. 22e), the carrier frequency and sidebands of even order combine destructively at the output of MZa 22, suppressing their output.

Likewise, a bias phase shifter 24c in one of the third arms (e.g., 24f) of MZb 24 exerts a relative phase shift on one of the third arms 24f in MZb 24 (with respect to the other third arm 24e) by 180°. The amount of phase shift exerted by the bias phase shifter 24c is controlled by a second bias control voltage from the bias controller 130. The laser beams in both third arms 24e and 24f are then combined by the combiner 24d. If the bias phase shifter 24d exerts a phase shift of 180° to one second arm (e.g. 24f), the carrier frequency and sidebands of even order combine destructively at the output of MZb 24, suppressing their output.

The phase modulation and phase shift at the second arms 22e and 22f can be represented by the following equations:

$$E_{out}(t) = E_{in}^A \sin[\omega_0 t + \delta \cos(\omega_m t + \phi_m) + \phi_{bias}]$$

Where $E_{out}(t)$ is the electrical field of the light wave in the second arm 22e (or 22f) before the combiner 22d. $E_{in}^A$, $\omega_0$ are the amplitude and angular frequency of the input wave's electrical field, respectively. $\omega_m$ is the angular frequency of the modulation signal. $E_{in}^A$, $\omega_0$ and $\omega_m$ apply equally to both arms 22e and 22f. The modulation phase $\phi_m$ is shifted by 180° between arms 22e and 22f due to the push-pull modulation architecture explained above. The bias phase shift $\phi_{bias}$ is zero in arm 22f; in arm 22e it can be controlled using the bias phase shifter 24c. For MT-OSSB operation $\phi_{bias}$ should equal 180°.

The same equations apply to the phase modulation and phase shift at the third arms 24e and 24f.

The third bias phase shifter 26 is located at the first arm 25 at which the MZb 24 is located. Alternatively, the phase shifter 26 may be located at the first arm 23 at which the MZa 22 is located. The phase shifter 26 receives a third bias control voltage from the bias controller 130 to ensure that the relative phase difference between the laser beams in the first arms 23 and 25 is 90°.

The laser beams at the two first arms 23 and 25 are then recombined by the combiner 29 to output a laser beam Eout, with the spectrum shown in FIG. 2. The output laser beam Eout has the MT-OSSB spectrum profile.

Figure 5:
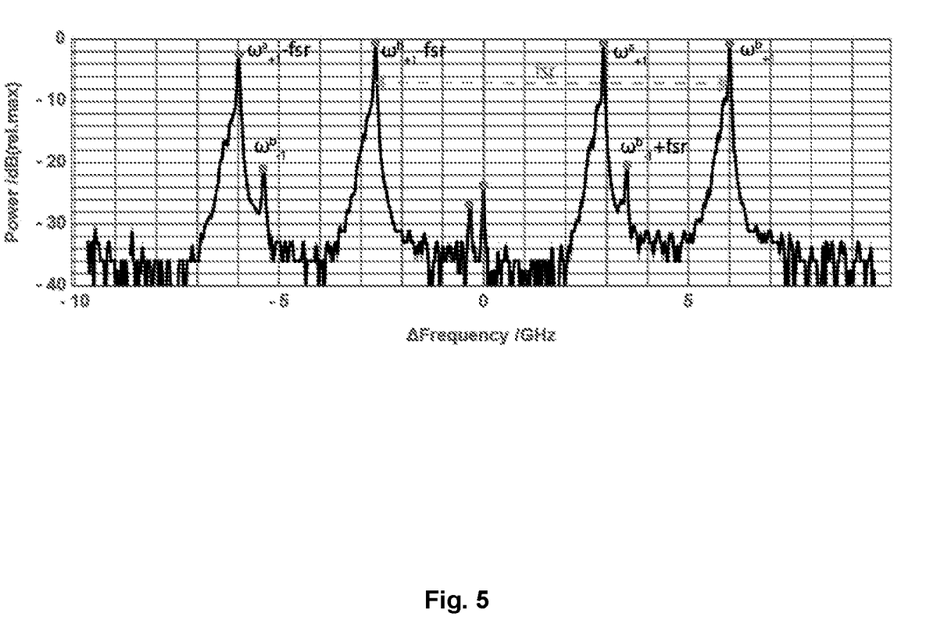
FIG. 5 is a diagram of measured spectral properties of the output of the IQ modulator of FIG. 4 generating MT-OSSB modulation signal.

FIG. 5 shows an example of a spectrum diagram of the laser beam Eout at the output of the IQ modulator 20. The spectrum diagram of FIG. 5 is determined using a scanning Fabry-Perot cavity at a laser wavelength of the laser 10 (e.g., at 1560 nm wavelength). The spectrum diagram shows two single sidebands at frequencies $w_a$=3.5 GHz and $w_b$=6.6 GHz. Each sideband generates a peak at each of the cavity modes which are spaced by fsr=10 GHz. The negative sidebands at frequencies $-w_a$ and $-w_b$ (not marked on FIG. 5) are suppressed by more than 20 dB. The spectrum diagram also shows that the laser beam from the laser 10 at f=0 is suppressed by 24 dB.

In one alternative arrangement described above, the bias controller 30 determines whether the phase bias generated by the phase shifters 22c, 24c and 26 are at the respective operating points (180°, 180°, 90°, respectively). It may do so by adding a small dither to the bias control voltages and observing the IQ modulator output Eout on a photodetector or a scanning Fabry-Perot cavity. If the phase biases are not at their operating points (for example, due to temperature drifts of the IQ modulator 20), the bias controller 30 changes the bias control voltages at the phase bias inputs of the IQ modulator 20 until these conditions are met.

The modulation signal module 40 is shown in FIG. 3. The modulation signal module 40 includes RF sources 41, phase shifters 42, RF combiners 43, diplexers 44, MW sources 45, MW combiners 46, phase shifters 47, and a transfer switch 48.

To generate one or more IQ modulation signals for the IQ modulator 20, each of the RF sources 41 and MW sources 45 outputs a signal at one specific frequency. In one arrangement, the frequencies generated by the RF sources 41 and MW sources 45 are locked to a frequency reference such as a GPS-disciplined RF oscillator. Each signal generated by the RF sources 41 is provided to one of the phase shifters 42, which splits the RF signal into two signals (namely, I and Q) with a relative phase shift of 90° between the I and Q modulation signals. Examples of the phase shifters 42 includes a 90 degree-hybrid-coupler, a delay line of appropriate length, and the like. The RF I and Q modulation signals from all RF sources 41, which are phase shifted by the phase shifters 42, are then combined using two of the RF combiners 43. That is, the RF I modulation signals are combined by one of the RF combiners 43, while the RF Q modulation signals are combined by another of the RF combiners 43. The combined RF I and Q modulation signals are then respectively fed into the low-frequency ports of the diplexers 44.

The signals from the MW sources 45 are combined with the MW combiner 46 and then split into two phase-shifted signals where the phase-shifted signals have a phase difference of 90°. The splitting and phase-shifting are performed by using the phase shifter 47. In one arrangement, the phase shifter 47 is a MW 90 degree-hybrid-coupler. The MW I and Q modulation signals (i.e., output of the phase shifter 47) are then respectively directed to the MW ports (i.e., the high frequency ports) of the diplexers 44. The assignment between I and Q modulation signals may be flipped with an optional transfer switch 48. The diplexers 44 combine the RF and MW signals for the I and Q ports. The diplexer output signals are then directly connected to the I and Q modulation inputs of the IQ modulator 20.

The flipping of the I and Q modulation signals by the transfer switch 48 changes the sign of the generated sideband and reverse the sign of the frequency offset between sideband and carrier. For example, if, before enabling the switch, I and Q modulated signals would have generated an output laser beam Eout with positive sideband with respect to the carrier frequency of the laser 10. After the switching, the output laser beam Eout would have sideband at a negative frequency with respect to the carrier frequency of the laser 10.

The above describes how one set of I and Q modulation signals is generated by the modulation signal module 40.

The modulation signal module 40 may contain amplifiers and attenuators to control the power of the I and Q modulation signals that is appropriate to manipulate the atomic sample 90 in the device 65.

In one arrangement, two different sets of MT-OSSB can be generated quasi-continuously by switching different RF and/or MW sources 41 and 45 in the modulation signal module 40 on and off at a fast rate (e.g. >1 kHz). This switching is performed in the modulation signal module 40 by controlling the output powers of the different RF/MW sources 41 and 45. This can, for example, facilitate the quasi-simultaneous optical cooling of multiple atomic species 90 within the bandwidth of the IQ modulator 20. Quasi-continuous means that the rate of switching between the different sets of MT-OSSB is fast enough (e.g., >1 kHz) so that different atoms can be effectively controlled at the same time.

For example, in order to generate a set of two carrier-suppressed single sidebands at frequencies 50 MHz and 6.8 GHz with respect to the optical carrier frequency of the laser 10 at the output of the IQ modulator 20, one RF source 41 is required to generate a 50 MHz signal and one MW source 45 is required to generate a 6.8 GHz signal.

First, the amplitude of the RF and MW sources 41 and 45 is controlled using RF/MW attenuators, switches and amplifiers (not shown) to obtain around 20 dBm at each modulation input of the IQ modulator 20. The level depends on the specific modulator used. The 50 MHz and 6.8 GHz signals are then split into I and Q modulation signals with a relative phase shift of 90° using hybrid couplers. Both I modulation signals from the RF and MW sources 41 and 45 are then combined using a first diplexer 44, and both Q modulation signals from the RF and MW sources 41 and 45 are combined using a second diplexer 44. The diplexer output signals are then fed into the two modulation inputs of the IQ modulator 20.

Therefore, the first diplexer 44 generates an I modulation signal based on the RF source 41 at 50 Mhz and the MW source 45 at 6.8 GHz.

Additional sidebands at, e.g., 600 MHz and 3.5 GHz, may be generated by switching on additional RF and MW sources 41 and 45 at these respective frequencies (using RF/MW switches, attenuators and amplifiers). The RF and MW outputs from these sources are again split into I and Q modulation signals (with 90° relative phase shift) and combined in the two diplexers 44 before entering the IQ modulator 20, generating another set of MT-OSSB.

The modulation signal module 40 can then switch between the first set of modulation signals (at 50 MHz and 6.8 GHz) and the second set of modulation signals (at 600 MHz and 3.5 GHz) to enable two different sets of MT-OSSB laser beams Eout to be generated at the output of the IQ modulator 20. The switching may be performed quasi-continuously.

As described above, the amplifier 50 and the frequency converter 60 are optional components. It is to be noted, however, that using the frequency converter 60 may add a layer of complexities in using the output laser beam Eout with MT-OSSB.

The frequency converter 60 may introduce additional frequency components. For example, for a laser beam Eout with frequencies fin1 (I1) and fin2 (I2) entering the converter 60, the output laser beam comprises the doubled frequency components 2*f1 (O1) and 2*f2 (O2) and the sum frequency f1+f2 (O12). The intensities of the output beams O1, O2 and O12 depend non-linearly on the intensity I1 and I2, with the efficiency O/I of the converter 60 increasing with I. Particularly, for dissimilar input intensities I1>I2, the output intensity O1 will be the largest, followed by O12; the intensity O2 will be small.

In one example, the optical system 100 is used for cooling and repumping Rubidium 87 and Rubidium 85 atoms at the D2 line with a 1560 nm laser. Another part of the laser output is directed to the IQ modulator 20 operating at 1560 nm and subsequently amplified and frequency doubled as indicated in FIG. 3. The frequencies of the positive sidebands required for cooling and repumping Rubidium 87 and Rubidium 85 are as follows:

| | | |
|---|---|---|
| Rubidium 87 | Cooling | 40 MHz +/− 20 MHz |
| | Repump | 6.6 GHz +/− 20 MHz |
| Rubidium 85 | Cooling | 600 MHz +/− 20 MHz |
| | Repump | 3.5 GHz +/− 20 MHz |

To provide the required laser beams, a part of the output of the laser 10 may be amplified by the amplifier 50 and frequency-doubled by the frequency converter 60 to 780 nm and locked to the Rb87 D2→F'¹⁄₃ cross-over transition. Therefore, to perform laser-cooling of Rb87 atoms, the laser beam output $E_{out}$ of the IQ modulator 20 must be at frequencies of f1=+40 MHz and f2=+6.6 GHz with respect to the carrier frequency before frequency doubling by the frequency converter 60. Cooling and repumping of 87Rb is then provided by the outputs of the frequency doubler with frequency 2*f1 and f1+f2, respectively (with respect to the frequency-doubled carrier). To perform laser-cooling of Rb85 atoms the laser beam output Eout at the IQ modulator 20 must be at frequencies of f3=600 MHz and f4=3.5 GHz before frequency doubling by the frequency converter 60. Cooling and repumping of 85Rb is then provided by the outputs of the frequency doubler with frequency 2*f3 and f3+f4, respectively (with respect to the frequency-doubled carrier). Therefore, the optical system 100 needs to be able to switch between the two sets of frequencies to control the Rb87 and Rb85 atoms. To generate the first set of frequencies of 40 MHz and 6.6 GHz, one of the RF sources 41 generates a signal at 40 MHz while one of the MW sources 45 generates a signal at 6.6 GHz. To generate the second set of frequencies of 600 MHz and 3.5 GHz, one of the RF sources 41 generates a signal at 600 MHz while one of the MW sources 45 generates a signal at 3.5 GHz. Before interaction with the atoms the frequency of the light may be shifted by ~100 Mhz using an acoustic-optic modulator or other frequency shifter.

The optical system 100 may also be used for an atom interferometer that is implemented through Bragg or Raman transitions. Other atom interferometers implemented through other transitions may also use the optical system 100.

To perform Bragg interferometry with the optical system 100, one frequency with a large detuning from the atomic resonances (>1 GHz) is generated. This may be implemented by using the transfer switch 48 to generate a negative sideband at −6.8 GHz with respect to the optical carrier of the laser 10. An additional pair of acousto-optic modulators in the device 65 can then be used to generate the two optical frequencies to facilitate optical Bragg transitions and atom. Alternatively, the two frequency components for Raman or Bragg interferometry may be generated by two RF/MW sources 45 or 41 in FIG. 3. For example, for 87Rb Bragg interferometry two RF/MW sources with a frequency difference of 5 kHz-5 MHz could be used (the actual RF/MW frequency is not critical here as long as the sidebands are not resonant with an atomic transition). For one example of Raman interferometry, one RF source and one MW source could be used with a frequency difference of around 6.8 GHz could be used.

Optical System 100 with an Embedded Controller

Figure 6A:
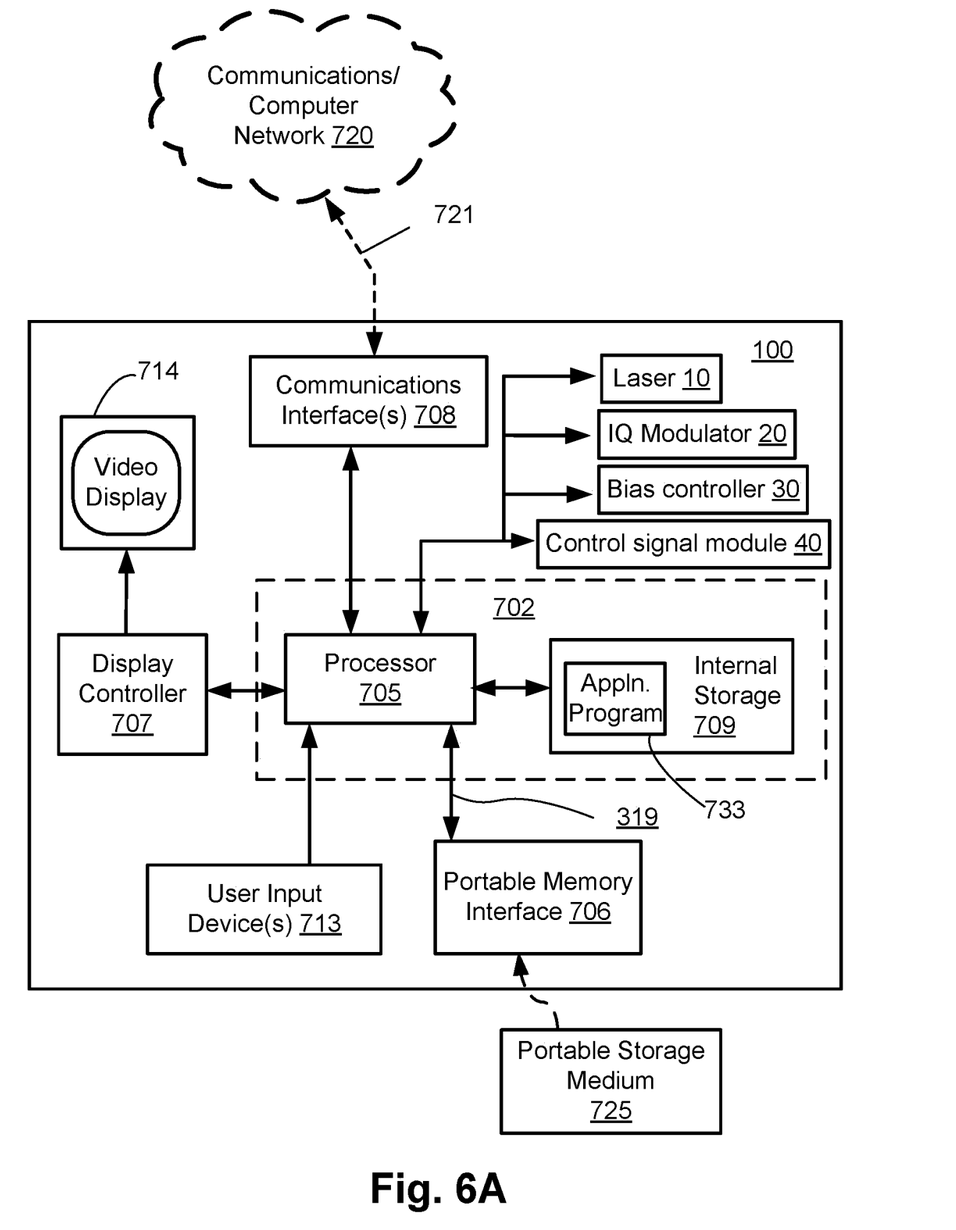
FIGS. 6A and 6B collectively form a schematic block diagram representation of an electronic device upon which described arrangements can be practised.
Figure 6B:
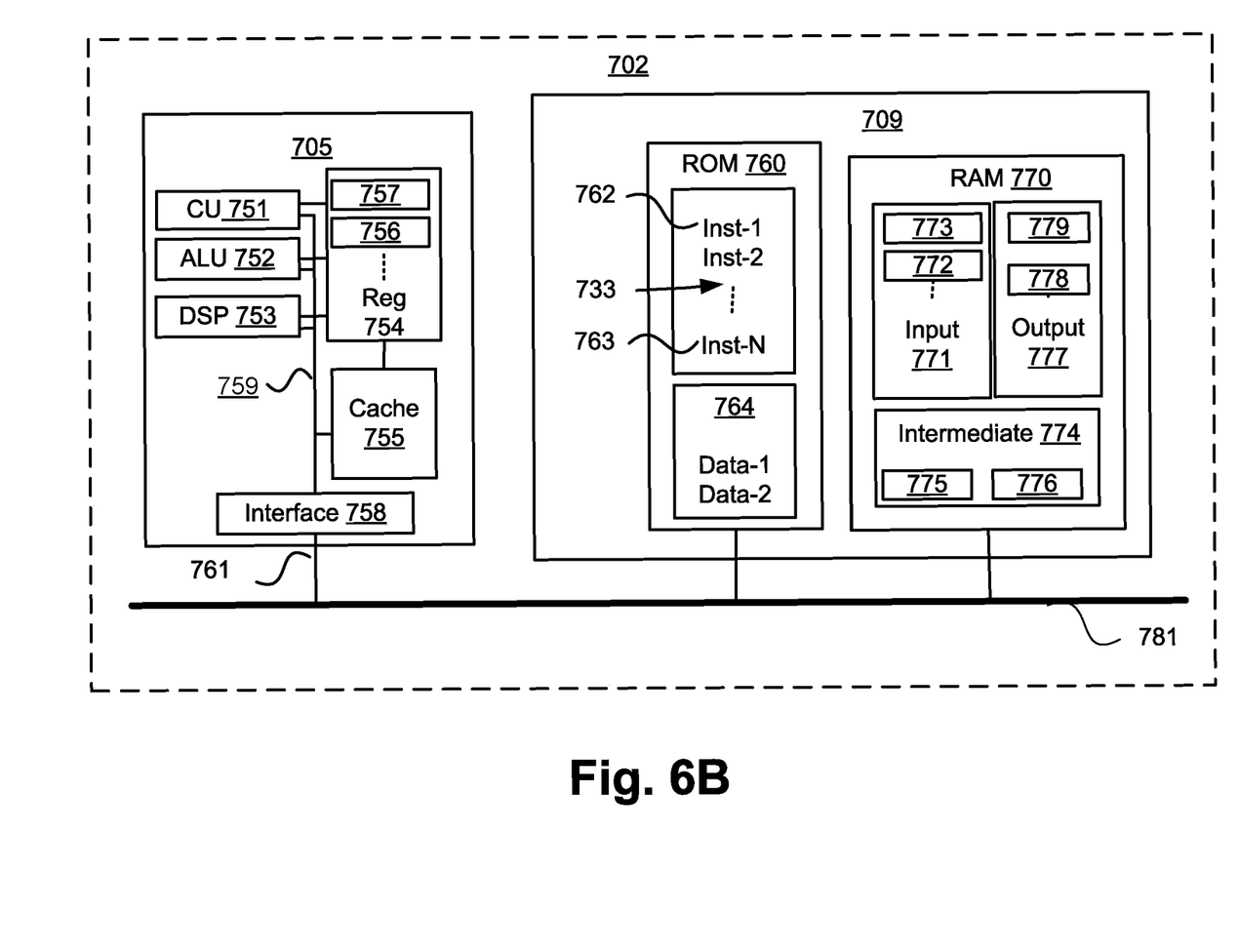

FIGS. 6A and 6B collectively form a schematic block diagram of the optical system 100 being controlled by an embedded controller 702. Alternatively, the optical system 100 may also be controlled by higher-level devices such as desktop computers, server computers, and other such devices with significantly larger processing resources.

As seen in FIG. 6A, the optical system 100 further comprises an embedded controller 702 for controlling the laser 10, the IQ modulator 20, the bias controller 30, and the modulation signal module 40. Accordingly, the optical system 100 may be referred to as an "embedded device." In the present example, the controller 702 has a processing unit (or processor) 705 which is bi-directionally coupled to an internal storage module 709. The storage module 709 may be formed from non-volatile semiconductor read only memory (ROM) 760 and semiconductor random access memory (RAM) 770, as seen in FIG. 6B. The RAM 770 may be volatile, non-volatile or a combination of volatile and non-volatile memory.

The optical system 100 further includes a display controller 707, which is connected to a video display 714, such as a liquid crystal display (LCD) panel or the like. The display controller 707 is configured for displaying graphical images on the video display 714 in accordance with instructions received from the embedded controller 702, to which the display controller 707 is connected.

The optical system 100 also includes user input devices 713 which are typically formed by keys, a keypad or like controls. In some implementations, the user input devices 713 may include a touch sensitive panel physically associated with the display 714 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 6A, the optical system 100 also comprises a portable memory interface 706, which is coupled to the processor 705 via a connection 719. The portable memory interface 706 allows a complementary portable memory device 725 to be coupled to the optical system 100 to act as a source or destination of data or to supplement the internal storage module 709. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The optical system 100 also has a communications interface 708 to permit coupling of optical system 100 to a computer or communications network 720 via a connection 721. The connection 721 may be wired or wireless. For example, the connection 721 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The processes for controlling the laser 10, the IQ modulator 20, the bias controller 30, and the modulation signal module 40 may be implemented as one or more software application programs 733 executable within the embedded controller 702. In particular, with reference to FIG. 6B, the steps of the control processes are effected by instructions in the software 733 that are carried out within the controller 702. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 733 of the embedded controller 702 is typically stored in the non-volatile ROM 760 of the internal storage module 709. The software 733 stored in the ROM 760 can be updated when required from a computer readable medium. The software 733 can be loaded into and executed by the processor 705. In some instances, the processor 705 may execute software instructions that are located in RAM 770. Software instructions may be loaded into the RAM 770 by the processor 705 initiating a copy of one or more code modules from ROM 760 into RAM 770. Alternatively, the software instructions of one or more code modules may be pre-installed in a non-volatile region of RAM 770 by a manufacturer. After one or more code modules have been located in RAM 770, the processor 705 may execute software instructions of the one or more code modules.

The application program 733 is typically pre-installed and stored in the ROM 760 by a manufacturer, prior to distribution of the optical system 100. However, in some instances, the application programs 733 may be supplied to the user encoded on one or more CD-ROM (not shown) and read via the portable memory interface 706 of FIG. 6A prior to storage in the internal storage module 709 or in the portable memory 725. In another alternative, the software application program 733 may be read by the processor 705 from the network 720, or loaded into the controller 702 or the portable storage medium 725 from other computer readable media. Computer readable storage media refers to any non-transitory tangible storage medium that participates in providing instructions and/or data to the controller 702 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the optical system 100. Examples of transitory or non-tangible computer readable transmission media that may also participate in the provision of software, application programs, instructions and/or data to the optical system 100 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 733 and the corresponding code modules mentioned above may be executed to implement one or more graphical user interfaces (GUIs) to be rendered or otherwise represented upon the display 714 of FIG. 6A. Through manipulation of the user input device 713 (e.g., the keypad), a user of the device 701 and the application programs 733 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 6B illustrates in detail the embedded controller 702 having the processor 705 for executing the application programs 733 and the internal storage 709. The internal storage 709 comprises read only memory (ROM) 760 and random access memory (RAM) 770. The processor 705 is able to execute the application programs 733 stored in one or both of the connected memories 760 and 770. When the electronic device 701 is initially powered up, a system program resident in the ROM 760 is executed. The application program 733 permanently stored in the ROM 760 is sometimes referred to as "firmware". Execution of the firmware by the processor 705 may fulfil various functions, including processor management, memory management, device management, storage management and user interface.

The processor 705 typically includes a number of functional modules including a control unit (CU) 751, an arithmetic logic unit (ALU) 752, a digital signal processor (DSP) 753 and a local or internal memory comprising a set of registers 754 which typically contain atomic data elements 756, 757, along with internal buffer or cache memory 755. One or more internal buses 759 interconnect these functional modules. The processor 705 typically also has one or more interfaces 758 for communicating with external devices via system bus 781, using a connection 761.

The application program 733 includes a sequence of instructions 762 though 763 that may include conditional branch and loop instructions. The program 733 may also include data, which is used in execution of the program 733. This data may be stored as part of the instruction or in a separate location 764 within the ROM 760 or RAM 770.

In general, the processor 705 is given a set of instructions, which are executed therein. This set of instructions may be organised into blocks, which perform specific tasks or handle specific events that occur in the optical system 100. Typically, the application program 733 waits for events and subsequently executes the block of code associated with that event. Events may be triggered in response to input from a user, via the user input devices 713 of FIG. 6A, as detected by the processor 705.

The execution of a set of the instructions may require numeric variables to be read and modified. Such numeric variables are stored in the RAM 770. The disclosed method uses input variables 771 that are stored in known locations 772, 773 in the memory 770. The input variables 771 are processed to produce output variables 777 that are stored in known locations 778, 779 in the memory 770. Intermediate variables 774 may be stored in additional memory locations in locations 775, 776 of the memory 770. Alternatively, some intermediate variables may only exist in the registers 754 of the processor 705.

The execution of a sequence of instructions is achieved in the processor 705 by repeated application of a fetch-execute cycle. The control unit 751 of the processor 705 maintains a register called the program counter, which contains the address in ROM 760 or RAM 770 of the next instruction to be executed. At the start of the fetch execute cycle, the contents of the memory address indexed by the program counter is loaded into the control unit 751. The instruction thus loaded controls the subsequent operation of the processor 705, causing for example, data to be loaded from ROM memory 760 into processor registers 754, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step of the control processes is associated with one or more segments of the application program 733, and is performed by repeated execution of a fetch-execute cycle in the processor 705 or similar programmatic operation of other independent processor blocks in the electronic device 701.

In summary, the embedded controller 702 in conjunction with the application programs 733 control the laser 10, the IQ modulator 20, the bias controller 30, and the modulation signal module 40. The embedded controller 702 can take instructions via the user input devices 713 to control the operation of the laser 10, the IQ modulator 20, the bias controller 30, and the modulation signal module 40. The embedded controller 702 can also display the operating parameters of the laser 10, the IQ modulator 20, the bias controller 30, and the modulation signal module 40 on the display 714.

INDUSTRIAL APPLICABILITY

The arrangements described are applicable to the optics and photonics interferometry industries and particularly for the controlling the atomic vapours and cold atoms used in parameter measurements of an atom interferometer, atomic magnetometer or atomic clock.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. An optical system for controlling atoms, the optical system comprising:
   a laser source generating a laser beam at a carrier frequency;
   a modulation signal module comprising a microwave (MW) frequency source generating a MW signal at a first frequency, and a radio frequency (RF) source generating a RF signal at a second frequency, the RF frequency and the MW frequency together defining a set of frequencies, the modulation signal module further configured to generate I and Q modulation signals at the set of frequencies; and
   an IQ modulator configured for receiving the laser beam and the generated I and Q modulation signals at the set of frequencies and for outputting an output laser beam based on the received laser beam and the generated I and Q modulation signals at the set of frequencies, wherein the output laser beam comprises multi-toned optical single-sidebands (MT-OSSB) offset from the carrier frequency by the set of frequencies and wherein the carrier frequency is suppressed.

2. The optical system according to claim 1, wherein the set of frequencies of the output laser beam controls the atoms.

3. The optical system according to claim 2, wherein the controlling of the atoms comprises atom cooling and atom repumping.

4. The optical system according to claim 1, comprising additional RF/MW sources, wherein the MW/RF sources are further configured to generate other sets of frequencies, and wherein the IQ modulator switches the output laser beam between the set of frequencies and the other sets of frequencies.

5. The optical system according to claim 4, wherein the set of frequencies and the other sets of frequencies are generated quasi-continuously.

6. The optical system according to claim 1, the optical system further comprising:
   a bias controller connected to the IQ modulator;
   wherein the bias controller determines whether the output laser beam of the IQ modulator meets a target output, and outputs bias control voltages to the IQ modulator to control the output laser beam of the IQ modulator toward the target output.

7. The optical system according to claim 1, the optical system further comprising:
   a switch configured for switching the I and Q modulation signals from the MW/RF sources entering the IQ modulator.

8. The optical system according to claim 1, wherein any one of the carrier frequency, the set of frequencies, and the other sets of frequencies is locked to a frequency reference.

9. The optical system according to claim 8, wherein the frequency reference comprises an atomic transition or a stable optical cavity.

10. The optical system according to claim 1, wherein the output laser beam is used for optical cooling and atom interferometry of Rubidium-85 and Rubidium-87 atoms.

11. The optical system according to claim 1, wherein the output laser beam is fed into a nonlinear optical frequency converter to shift the frequencies of the output laser beam.

12. The optical system according to claim 1, wherein the optical system is used for an atom interferometer.

* * * * *